United States Patent
Misar et al.

(10) Patent No.: US 12,111,279 B2
(45) Date of Patent: Oct. 8, 2024

(54) INSULATING MATERIAL, METHOD FOR INSPECTING THE WELD AND CONTROL SYSTEM FOR QUALITY CONTROL OF THE WELD

(71) Applicant: A.W.A.L. S.R.O., Prague (CZ)

(72) Inventors: Ivan Misar, Vestec (CZ); Marek Novotný, Prague (CZ); Marcel Pelech, Roztoky (CZ)

(73) Assignee: A.W.A.L. S.R.O., Prague (CZ)

( * ) Notice: Subject to any disclaimer, the term of this patent is extended or adjusted under 35 U.S.C. 154(b) by 219 days.

(21) Appl. No.: 17/601,286

(22) PCT Filed: Apr. 2, 2020

(86) PCT No.: PCT/CZ2020/000014
§ 371 (c)(1),
(2) Date: Oct. 4, 2021

(87) PCT Pub. No.: WO2020/200333
PCT Pub. Date: Oct. 8, 2020

(65) Prior Publication Data
US 2022/0214297 A1 Jul. 7, 2022

(51) Int. Cl.
*G01N 27/24* (2006.01)
*B23K 31/02* (2006.01)
(Continued)

(52) U.S. Cl.
CPC .............. *G01N 27/24* (2013.01); *B23K 31/02* (2013.01); *B23K 31/125* (2013.01); *B32B 5/02* (2013.01);
(Continued)

(58) Field of Classification Search
CPC ........ B23K 31/02; G01N 27/02; G01N 27/22; G01N 27/24; B32B 2419/06; B32B 11/04;
(Continued)

(56) References Cited

U.S. PATENT DOCUMENTS 3,106,838 A * 10/1963 Crooks .................. G01M 7/08
73/588
3,262,006 A * 7/1966 Sciaky .................. G01J 5/0018
314/63

(Continued)

FOREIGN PATENT DOCUMENTS

| DE | 4 239 495 | | 5/1994 |
| WO | 2011/045354 A1 | | 4/2011 |
| WO | WO2011045354 | * | 4/2011 |

OTHER PUBLICATIONS

ISR for International Application PCT/CZ2020/000014 mailed Jun. 18, 2020.
(Continued)

*Primary Examiner* — Vinh P Nguyen
(74) *Attorney, Agent, or Firm* — LADAS & PARRY LLP

(57) ABSTRACT

An insulating material for a waterproofing system having first and second insulating elements joined by melting or welding to form a connecting joint. The insulating material being provided on at least one side with a combustible or thermally destructible and electrically conductive element. Also, a method of inspecting the connecting joint and a control system for controlling the quality of the connecting joint.

17 Claims, 3 Drawing Sheets

(51) Int. Cl.
*B23K 31/12* (2006.01)
*B32B 5/02* (2006.01)
*B32B 7/12* (2006.01)
*B32B 15/085* (2006.01)
*B32B 15/09* (2006.01)
*B32B 15/14* (2006.01)
*B32B 15/20* (2006.01)
*B32B 27/32* (2006.01)
*B32B 27/36* (2006.01)
*E02D 31/02* (2006.01)
*E21D 11/38* (2006.01)
*G01N 27/02* (2006.01)

(52) U.S. Cl.
CPC .............. *B32B 7/12* (2013.01); *B32B 15/085* (2013.01); *B32B 15/09* (2013.01); *B32B 15/14* (2013.01); *B32B 15/20* (2013.01); *B32B 27/32* (2013.01); *B32B 27/36* (2013.01); *E02D 31/02* (2013.01); *E21D 11/385* (2013.01); *G01N 27/02* (2013.01); *B32B 2262/0276* (2013.01); *B32B 2262/103* (2013.01); *B32B 2307/202* (2013.01); *B32B 2307/7265* (2013.01); *B32B 2307/732* (2013.01)

(58) Field of Classification Search
CPC ....... B32B 11/08; B32B 15/08; B32B 15/085; B32B 15/09; B32B 15/14; B32B 15/20; B32B 2255/205; B32B 2262/0276; B32B 2262/103; B32B 2307/202; B32B 2307/7265; B32B 2307/732; B32B 2419/00; B32B 27/08; B32B 27/32; B32B 27/36; B32B 5/02; B32B 7/12
See application file for complete search history.

(56) References Cited

U.S. PATENT DOCUMENTS

| | | | | |
|---|---|---|---|---|
| 3,567,899 | A | * | 3/1971 | Iceland ................ B23K 9/0956 219/124.34 |
| 4,218,922 | A | * | 8/1980 | Ensminger ............ G01N 27/20 73/588 |
| 5,493,897 | A | * | 2/1996 | Nomura ................ G01N 27/12 73/31.06 |
| 5,533,398 | A | * | 7/1996 | Sakurai .................... G01N 3/38 73/815 |
| 6,099,718 | A | | 8/2000 | Duthoo et al. |
| 9,157,828 | B2 | * | 10/2015 | Jaman .................. E04D 13/006 |
| 10,344,470 | B2 | * | 7/2019 | Golding, Jr. .......... G01M 3/045 |
| 10,519,664 | B1 | * | 12/2019 | Gunness ................ G01M 3/16 |
| 2018/0010329 | A1 | | 1/2018 | Golding, Jr. et al. |

OTHER PUBLICATIONS

Written Opinion for International Application PCT/CZ2020/000014 mailed Jun. 18, 2020.
WO 2011/045354 A1 published Apr. 21, 2011 English Translation.
DE 42 394 95 dated May 26, 1994 _ English Translation.

* cited by examiner

INSULATING MATERIAL, METHOD FOR INSPECTING THE WELD AND CONTROL SYSTEM FOR QUALITY CONTROL OF THE WELD

This application is a national phase entry under 35 USC 371 of International Patent Application No PCT/CZ2020/000014 filed on 2 Apr. 2020, which claims the benefit of CZ Application No. PUV 2019-36081 filed on 3 Apr. 2019, the entire content of which is incorporated herein by reference.

TECHNICAL FIELD

The invention relates to an insulating element, in particular a waterproofing strip or other insulating parts, by which the control of their connection carried out by melting (melting-down) or welding is important, a method of inspection of welds and melting-down of insulating elements and a control system of welds and melting-down of insulating elements.

BACKGROUND ART

At present, insulating elements, in particular waterproofing strips, are joined by melting or welding. The quality of these joints is often the basic quality parameter of the insulation to be carried out, since their imperfect execution is often the cause of technical difficulties that cause leakage or even total malfunction of the insulation. Therefore, there is currently a growing demand for an effective and demonstrable inspection of perfect joining of individual insulating elements or perfect adhesion of insulating elements to a substrate.

However, such a control system is currently not available. Leakages are more often prevented by organizational measures that lead to more detailed technological procedures and the use of a more qualified operator, but this does not lead to the demonstration of the joint tightness or the adhesion to the entire surface of the substrate. The tightness of welds is checked visually, by an electric spark, by an electric arc, by an ultrasound, by a vacuum bell or by an overpressure exerted in the double-track weld channel. Due to the tensile strength, the overpressure method used in synthetic films cannot be used in some waterproofing systems, for example in asphalt strips.

The current inspection methods focus on the tightness evaluation and are usually not able to give information exactly where the faulty connection or adhesion of the insulating element occurred. The existing control possibilities are limited mainly in hard-to-reach places such as corners and passages, where failures of perfect connection or adhesion are most common.

The actual tightness of the welds is currently performed visually, by an electric spark, by an electric arc, by an ultrasonic, a vacuum applied bell or by the overpressure exerted in the double-track weld channel. Due to the tensile strength, the overpressure method used in the case of synthetic films cannot be used in some waterproofing systems, for example asphalt strips.

Moreover, all the aforementioned methods evaluate only the tightness, not the width of the joint, and are limited by unevenness in the case of vacuum bells, or inaccessibility of corners, or infeasibility for joints of materials with lower tensile strength of the joined material, as in the case of asphalt sheets and overpressure testing.

The ultrasonic method is practically impracticable, especially in winter, due to the use of water gels.

All methods used so far are laborious, costly and above all inaccurate and unreliable.

SUMMARY OF THE INVENTION

The invention is based on an insulating element, in particular a strip or other insulating element, joined in particular by melting-down or welding, which is provided on at least one side with a combustible or thermally destructible and electrically conductive element.

The electrically conductive element may be a metal foil or a metal fiber. The combustible and electrically conductive element may be attached to the insulating element or the support layer electrostatically, by gluing or by means of a self-adhesive layer.

The combustible and electrically conductive element may be a foil having a thickness of 2 to 15 microns, comprising a support layer and a metal continuous or discontinuous layer having a thickness of 1 to 5 microns, or electrically conductive fibers. The metal discontinuous layer may be a system of at least two strips of metal foil having a thickness of 1 to 5 microns, which is applied to the support layer of the combustible and electrically conductive element.

The combustible and electrically conductive element may be a film having an inner layer of polyethylene and a metal layer of aluminum or having an inner layer of molded polyester fibers with an admixture of long conductive fibers or having an inner layer of softened polyvinyl chloride with molded electrically conductive fibers or the combustible foil consists of a support layer of polyethylene terephthalate with a conductive metal layer.

The combustible and electrically conductive element extends over the entire surface of the insulating element or in a continuous or discontinuous strip at the very edge of the insulating element or is located up to 10 cm from the edge of the insulating element, or anywhere within the entire width of the joint overlap.

The present invention also relates to a method of inspecting of welds and melting-down of insulating elements, in particular strips, which is characterized in that the measurement of electrical impedance or electrical capacity detects the presence of a combustible electrically conductive film after thermally bonding the insulating elements, wherein the presence of the electrically conductive film after thermally joining the insulating elements indicates an unburned or insufficiently burnt electrically conductive film and thus poor quality connection of insulating elements. Advantageously, the presence of the electrically conductive layer after the thermal bonding of the insulating elements is converted into an audible signal for an easy indication of imperfect or poorly formed welds or connections of the insulating elements.

Another object of the invention is to provide a control system for welding and melting-down of insulating elements, characterized in that it is formed by an insulating element which is provided on one side with a combustible synthetic electrically conductive film for determining the quality of the welds and melting to the substrate and a device for measuring electrical variables for detecting the presence of a combustible synthetic electrically conductive film after thermally joining the insulating elements. The device for detecting the presence of combustible synthetic electrically conductive film after thermally joining the insulating elements is an electrical impedance measuring device or an electrical capacity measuring device.

The electrically conductive combustion element is burned down upon melting or welding, in the case of a film including its conductive, for example metallized layer. Due to its conductive layer, the presence or absence of this film is easily identified by its electrical impedance or induction measurement. The presence of an electrically conductive, for example metallized layer, indicates clearly and precisely the points of unburned or insufficiently burnt film, which is a unequivocal and demonstrably evidence of the poor joining of the insulating elements or the adhesion of the insulating element to the substrate. Performing such a proper connection inspection is extremely fast, inexpensive, and provides information on where the incomplete or imperfect connection occurred. At the same time, the operator is usually informed about these imperfections by an audible signal.

The invention also makes it possible to detect the residual amount of possibly un-welded film and if the film has not been destroyed at the weld location, this means that a poor-quality weld or melting is carried out at that location, which then needs to be repaired.

BRIEF DESCRIPTION OF THE DRAWINGS

An exemplary embodiment of the invention is shown schematically in the accompanying drawings, wherein.

DETAILED DESCRIPTION OF THE INVENTION

Figure 1:
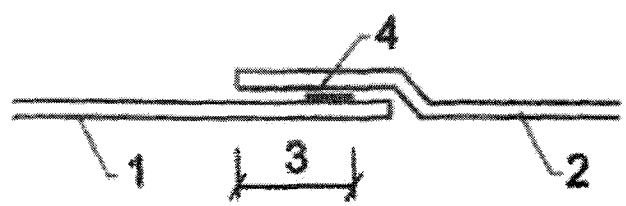
FIG. 1 shows the connection of two asphalt strips, wherein the lower asphalt strip is in the mutual overlap provided with the combustible and electrically conductive local film.

The object of the present invention is to provide an insulating element, most commonly a waterproofing strip, at the points where the strips should be joined or where they are to adhere to the substrate, and it is assumed that these are points where the inspection of their joining or adhering by means of the electrically conductive element should be carried out. However, the insulating element can also be a differently shaped insulating element as well as a variety of additional insulating elements, such as roof outlets, passages, grommets and moldings.

The combustible and electrically conductive element may be attached to the insulating element or support layer, for example, electrostatically, by gluing or by means of a self-adhesive layer. It can be implemented in an insulating element, in particular a waterproofing strip, directly in the production of the strip, either over the entire surface of the strip or only in a part thereof, at locations in the welded areas. It can also be implemented in the form of a thin self-adhesive foil at the locations of the specified welds directly at the welding site, usually on site.

The combustibility of the combustible and electrically conductive element is understood so that as combustible is considered to be the element which is destroyed for example by a flame. For destruction is also understood the destruction of this layer, for example, by hot air or a so-called hot wedge, which utilizes the electrical resistance heating of the steel wedges, followed by an integrated pressure roller.

For example, after application of an asphalt strip to the surface, i.e. after laying it and welding by flame or hot air, where the applied temperature must be capable of complete destruction of the combustible film layer including the conductive layer, the quality of welds and local or full-area melting and thus the adhesion to the substrate, are subsequently tested by means of electrical impedance or induction measuring devices which are commonly available.

In the case of high-quality welds or melting-down to the base, the film will be destroyed or liquidated, which film will be technologically replaced by a homogeneous joint. The method according to the invention also detects even the residual amount of the un-welded film and if the film has not been destroyed at the weld site, this means that a poor-quality weld or melting has been carried out at that point and needs to be repaired. The most preferred device is a device for measuring the electrical impedance.

Example 1

In the field of engineering constructions, in particular waterproofing of traffic constructions, bridge decks, tunnels, ditches, reservoirs, dams, dams, leaching areas and reservoirs in mining industry, landfills, water channels, waterproofing of substructures, protection of building structures against ground moisture and water, a bitumen geomembrane or a large-size loose-laid asphalt strip with welded overlaps are advantageously used, where the inspection of welds is generally required.

The waterproofing strip is provided with a combustible and electrically conductive film 4, which consists of an inner layer of polyethylene or polyethylene terephthalate having the thickness 10 microns and a metallic, electrically conductive film, in this case aluminum foil having the thickness 2 microns. In this case, the implementation of the metal foil is carried out directly in the asphalt strip manufacturing plant, but it is also possible to provide this strip with a combustible and electrically conductive element at the construction site, for example by gluing it to the site of the assumed joint design. Locally, it is possible to use a self-adhesive variant of the combustible and electrically conductive film which is applied in details and transversal overlaps either within the production, preparation or on site. The metal foil may also be replaced by another electrically conductive layer, for example by a layer of electrically conductive plastics or an electrically conductive fabric. The combustible metal film can be made discontinuous, that is, it can be made not over the entire surface, but for example in differently spaced strips.

As shown in FIG. 1, it is necessary to join the lower asphalt strip 1 with the upper asphalt strip 2 by overlapping the two asphalt strips by welding. As a rule, the manufacturer himself specifies the minimum weld width 3 for correct and safe welding. At the edge of the lower asphalt strip 1, a combustible and electrically conductive foil 4 is placed.

The location of the combustible and electrically conductive foil 4 relative to the edge of the lower asphalt strip 1 may vary, in particular according to the quality control requirements of the weld performance. The combustible and electrically conductive film 4 may be positioned on the upper face of the lower asphalt strip 1 overlapping across the inner side of the asphalt strip at a distance from its end edge, preferably about 4 cm from the end edge, and includes only a portion of the required minimum weld width 3 as shown in FIG. 1

Another possibility is to place the combustible and electrically conductive film 4 on the upper face of the lower asphalt strip 1 overlapping across the entire width of the required minimum weld width 3, usually also at a distance of about 4 cm from the end edge of the lower asphalt strip 1, taking into account the manufacturer's requirements for a minimum weld joint width.

It is possible to place the combustible and electrically conductive film 4 on the upper face of the lower asphalt strip 1 overlapping over the entire width of the overlap, that is to the end of the edge of the lower asphalt strip 1.

After application of the asphalt strip to the surface and after its welding by flame, where the applied temperature or welding energy is such that the combustion foil including the possible metallized coating is burnt, the quality of welds and full-area melting-down to the substrate including the join homogeneity is subsequently tested by means of the electrical impedance measuring device.

Example 2

Figure 2:
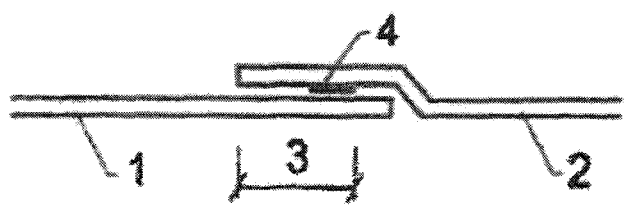
FIG. 2 shows the connection of two asphalt strips, wherein the upper asphalt strip is provided with a combustible and electrically conductive local film.

A second specific embodiment is based on the previous example number 1, but the location of the combustible and electrically conductive film 4 is provided on the lower face of the upper strip in their mutual overlap, as shown in FIG. 2.

The location of the combustible and electrically conductive film 4 relative to the edge of the upper asphalt strip 2 may vary, in particular according to the quality control requirements of the weld performance. The combustible and electrically conductive film 4 may be disposed on the lower face of the upper asphalt strip 2 overlapping across the inner side of the asphalt strip at a distance from its end edge, preferably about 4 cm from the end edge, and comprises only a portion of the required minimum weld width 3 as shown in FIG. 2.

Another possibility is to place the combustible and electrically conductive foil 4 on the lower face of the upper asphalt strip 2 overlapping across the entire width of the required minimum weld width 3, usually also at a distance of about 4 cm from the end edge of the upper asphalt strip 2.

It is possible to place the combustible and electrically conductive film 4 on the lower face of the upper asphalt strip 2 overlapping across the entire width of the overlap, i.e. to the end of the edge of the upper asphalt strip 2, taking into account the manufacturer's requirements for a minimum width of the welded joint.

Example 3

The third specific embodiment of the present invention is based on the requirement that the subject matter of the inspection be a full-surface melting of the insulating element and a full-surface proper adhesion of the insulating element to the substrate.

Figure 3:
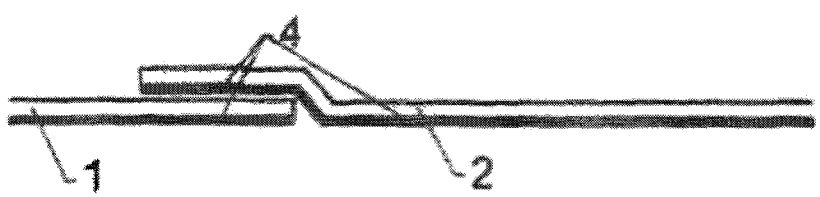
FIG. 3 illustrates the joining of the asphalt strips to the substrate where a full-area inspection is required and at least one of the asphalt strips is provided with a fully combustible and electrically conductive film.

This is particularly advantageous for use in civil engineering, especially waterproofing of traffic constructions, i.e. bridge decks and tunnels, locally reservoirs, barrages, dams, landfills, water channels, where melting to the substructure is required, fully-sealable asphalt strips for waterproofing substructures, for protection of building structures against ground moisture and water, fully-fusible asphalt sheets for roof waterproofing, both single-layer and multilayer systems and the like. This example of the technical solution is schematically illustrated in FIG. 3.

This example differs from the previous examples of the particular embodiment of the invention in that at least one of the insulating elements is provided with a combustible and electrically conductive film over the entire surface of the insulating element.

In the particular case, it is again the lower asphalt strip 1 and the upper asphalt strip 2, which in both cases are provided with a combustible and electrically conductive foil 4 over their entire surface, either on the upper or lower surface. FIG. 3 describes the embodiment, wherein the insulating element, i.e. the lower asphalt strip 2 and the upper asphalt strip 1 are provided with a combustible and electrically conductive film on their lower surface.

Figure 4:
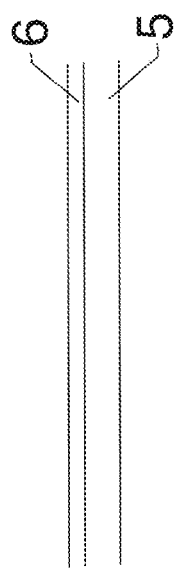
FIG 4 shows a possible configuration of the combustible and electrically conductive film shown in FIGS. 1, 2 or 3.

As shown in FIG. 4, the combustible and electrically conductive film 4 of the invention can comprise two (2) layers, including an inner layer 5 and a conductive layer 6. For example, layer 5 could comprise polyethylene or pressed polyester fibers with an admixture of long conductive fibers. Alternatively, inner layer 5 could comprise softened polyvinyl chloride with molded electrically conductive fibers. As another alternative, layer 5 could comprise polyethylene terephthalate and layer 6 could be a conductive layer comprising metal such as aluminum.

Figure 5:
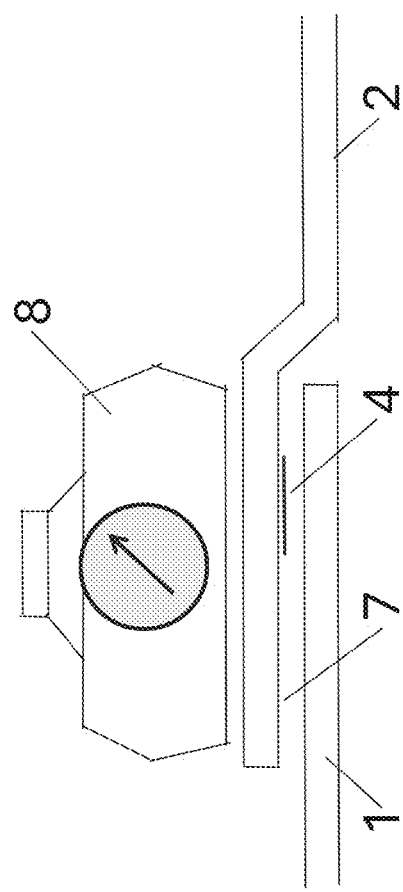
FIG. 5 shows a control system comprising a connecting joint formed between the two asphalt strips of FIG. 1 and a device for measuring an electrical impedance or electrical capacity of the connecting joint.

As shown in FIG. 5, a control system of the invention can comprise a combination of (a) an insulating material comprising asphalt strip 1 welded to asphalt strip 2 with combustible and electrically conductive film 4 being disposed with the confines of, and forming part of, connecting joint 7; and (b) a device 8 for measuring electrical impedance or electrical capacity of any remnant of the combustible and electrically conductive film that is not destroyed in forming the weld.

INDUSTRIAL APPLICABILITY

The invention can be used for all kinds of insulating elements, in particular for waterproofing asphalt strips, where the essential aspect for carrying out the insulating works is the need to demonstrably detect the perfect connection of the individual strips of insulation or the perfect adhesion of the insulating element to the substrate.

LIST OF REFERENCE NUMERALS

1—lower asphalt strip
2—upper asphalt strip
3—minimum weld width
4—combustible and electrically conductive film The invetion claimed is:
1. A composite comprising:
 (a) a strip comprising an insulating material that is electrically non-conductive, the strip comprising opposed first and second sides, each of the first and second sides having opposed first and second ends; and
 (b) a film comprising a combustible or thermally destructible and electrically conductive material disposed on at least the first side of the strip and on at least a portion of the first end of the first side, the thermally destructible and electrically conductive material being combustible or thermally destructible under conditions of fusion or welding of the strip such that, when the first end of the first side of the strip with the film disposed thereon is fused or welded to an end of a second insulating material that is electrically non-conductive to form a connecting joint, the connecting joint will not be electrically conductive unless at least a remnant of the combustible or thermally destructible element is not destroyed in the fusing or welding, the remnant being detectable to show that an imperfection is present in the connecting joint.

2. The composite according to claim 1, wherein the combustible or thermally destructible material comprises a metal foil or a metal fiber.

3. The composite according to claim 1, wherein the film has a thickness of 2 to 15 microns, wherein the film comprises a metal layer comprising a metal foil or electrically conductive fibers.

4. The composite according to claim 3, wherein the metal layer is a discontinuous layer comprising at least two strips of metal film each having a thickness of 1 to 5 microns.

5. The composite according to claim 1, wherein the film is attached to the strip electrostatically, by gluing or by an adhesive layer.

6. The composite according to claim 1, wherein the film is selected from the group consisting of:
   (i) a film having an inner layer comprising polyethylene and a metal layer comprising aluminum;
   (ii) a film having an inner layer comprising pressed polyester admixed with conductive fibers;
   (iii) a film having an inner layer comprising softened polyvinyl chloride admixed with molded electrically conductive fibers; and
   (iv) a film having a layer comprising polyethylene terephthalate and a conductive metal layer.

7. The composite according to claim 1, wherein the film extends over an entirety of the first side of the strip.

8. A kit comprising
   (a) The composite according to claim 7; and
   (b) a device for measuring electrical impedance, electrical capacity to detect a presence in the connecting joint of the remnant.

9. The composite according to claim 1, wherein the film comprises a continuous or discontinuous elongate piece at an edge of the strip or up to 10 cm from the edge of the strip.

10. A kit comprising
   (a) the composite according to claim 1; and
   (b) a device for measuring electrical impedance, electrical capacity to detect a presence in the connecting joint of the remnant.

11. A kit comprising
   (a) a composite consisting of (i) a first element comprising an insulating material that is not electrically conductive, the first element being provided with a thermally destructible or combustible film on at least one surface of the first element, the thermally destructible or combustible film being electrically conductive unless it has been fully combusted or destructed in which case it would not be electrically conductive; and (ii) a second element comprising an material that is not electrically conductive; the first and second insulating elements being joined together only at respective first ends thereof by welding or melting-down with the thermally destructible or combustible film disposed therebetween to form a connecting joint, respective second ends of the first and second elements being spaced from the connecting joint; and
   (b) a device for determining if the connecting joint is electrically conductive by measuring electrical impedance, electrical capacity electrical variables to detect whether the insulating material comprises combustible film that has not been fully combusted or destructed.

12. The kit according to claim 11, wherein the combustible or thermally destructible element extends over an entirety of the surface of the first insulating element.

13. A composite formed by fusing or welding a first element comprising an insulating material that is not electrically conductive and a second element comprising an insulating material that is not electrically conductive to form fused first and second elements joined in a connecting joint, wherein the first element comprises a combustible or thermally destructible element disposed on at least a portion of at least one surface of the first element, the combustible or thermally destructible element being electrically conductive and being combustible or thermally destructible under conditions of fusion or welding, wherein the fused first and second elements overlap one another only in the connecting joint with respective first ends of the fused first and second elements disposed in the connecting joint and respective second ends of the fused first and second elements spaced from the connecting joint, the connecting joint comprising at least a remnant of the combustible or thermally destructible element not destroyed in the fusing or welding, the remnant being disposed in the connecting joint between the overlapping first ends of the fused first and second elements such that an imperfection in the connecting joint can be detected by testing the connecting joint for presence of the remnant.

14. The composite according to claim 13, wherein the first element comprises the combustible or thermally destructible element on an entirety of the at least one surface of the first insulating element.

15. A method comprising the steps of:
   (a) providing first and second insulating elements, the first insulating element comprising a first layer of insulating material and a second layer comprising a combustible or thermally destructible element disposed on at least an end portion of at least one surface of the first layer of insulating material, the combustible or thermally destructible element being electrically conductive and being combustible or thermally destructible under conditions of fusion or welding;
   (b) melting down or welding respective first ends of the first and second insulating elements to form fused first and second insulating elements joined in a connecting joint, wherein the fused first and second insulating elements overlap one another only in the connecting joint with respective first ends of the fused first and second insulating elements disposed in the connecting joint and respective second ends of the fused first and second insulating elements spaced from the connecting joint, the connecting joint comprising at least a remnant of the combustible or thermally destructible element not destroyed in the fusing or welding, the remnant being disposed in the connecting joint between the overlapping first ends of the fused first and second insulating elements such that an imperfection in the connecting joint can be detected by testing the connecting joint for presence of the remnant; and
   (c) testing the connecting joint to determine whether the remnant of the combustible or thermally destructible element is present in the connecting joint.

16. The method according to claim 15, wherein the second layer of the first insulating element provided in step (a) comprises the combustible or thermally destructible element on an entirety of the at least one surface of the first layer of insulating material.

17. The method according to claim 16, wherein a portion of the combustible or thermally destructible element that is not disposed in the connecting joint is fused to a surface of another substrate.

\* \* \* \* \*